United States Patent
Toko et al.

(10) Patent No.: US 10,168,595 B2
(45) Date of Patent: Jan. 1, 2019

(54) ELECTRODEPOSITION ELEMENT AND MIRROR DEVICE

(71) Applicants: STANLEY ELECTRIC CO., LTD., Meguro-ku, Tokyo (JP); NATIONAL UNIVERSITY CORPORATION CHIBA UNIVERSITY, Chiba-shi, Chiba (JP)

(72) Inventors: Yasuo Toko, Yokohama (JP); Manabu Yatabe, Yokohama (JP); Norihisa Kobayashi, Chiba (JP)

(73) Assignees: STANLEY ELECTRIC CO., LTD., Tokyo (JP); NATIONAL UNIVERSITY CORPORATION CHIBA UNIVERSITY, Chiba-Shi, Chiba (JP)

( * ) Notice: Subject to any disclaimer, the term of this patent is extended or adjusted under 35 U.S.C. 154(b) by 336 days.

(21) Appl. No.: 14/880,423

(22) Filed: Oct. 12, 2015

(65) Prior Publication Data
US 2016/0054632 A1 Feb. 25, 2016

Related U.S. Application Data
(63) Continuation of application No. PCT/JP2014/002227, filed on Apr. 21, 2014.

(30) Foreign Application Priority Data
Apr. 22, 2013 (JP) .................. 2013-089601

(51) Int. Cl.
*G02F 1/153* (2006.01)
*G02F 1/15* (2006.01)
(Continued)

(52) U.S. Cl.
CPC ............ *G02F 1/1506* (2013.01); *B60R 1/088* (2013.01); *G02F 1/19* (2013.01)

(58) Field of Classification Search
CPC ...... G02F 1/1506; G02F 1/155; G02F 1/1508; G02F 1/163; G02F 1/19; G02F 1/1523;
(Continued)

(56) References Cited

U.S. PATENT DOCUMENTS

| 5,864,420 A | 1/1999 | Udaka et al. |
| 6,256,135 B1 | 7/2001 | Tench et al. |

(Continued)

FOREIGN PATENT DOCUMENTS

| CN | 1171561 A | 1/1998 |
| JP | 2003511719 A | 3/2003 |

(Continued)

OTHER PUBLICATIONS

Japanese Office Action (and English translation thereof) dated Mar. 14, 2017, issued in counterpart Japanese Application No. JP 2013-089601.

(Continued)

*Primary Examiner* — Mahidere Sahle
(74) *Attorney, Agent, or Firm* — Holtz, Holtz & Volek PC

(57) ABSTRACT

An electrodeposition element is provided which includes a first substrate including a first member and an electrode arranged above the first member, a second substrate arranged opposite to the first substrate and including an electrode, and an electrolyte layer arranged between the electrodes of the first substrate and the second substrate, and including an electrodeposition material that contains silver. When a voltage is applied between the electrodes of the first substrate and the second substrate such that the first substrate side is negative and the second substrate side is positive, a reflective surface made of a silver thin film and (Continued)

reflecting light, which is incident from a direction normal to the first and second substrates, in a direction not parallel to the incident direction of the light is formed above the electrode of the first substrate.

8 Claims, 15 Drawing Sheets

(51) Int. Cl.
    *G02F 1/19*         (2006.01)
    *B60R 1/08*         (2006.01)

(58) Field of Classification Search
    CPC ......... G02F 1/1525; G02F 1/157; G02B 5/08; G02B 5/24
    USPC .................................................. 359/245–274
    See application file for complete search history.

(56) References Cited

U.S. PATENT DOCUMENTS

| | | |
|---|---|---|
| 6,400,491 B1 | 6/2002 | Tench et al. |
| 6,469,683 B1 * | 10/2002 | Suyama ............. G02B 27/2271 345/32 |
| 2004/0061919 A1 * | 4/2004 | Tench ................... G02F 1/1506 359/265 |
| 2014/0218781 A1 | 8/2014 | Kobayashi et al. |

FOREIGN PATENT DOCUMENTS

| | | |
|---|---|---|
| JP | 2004504628 A | 2/2004 |
| JP | 2012181389 A | 9/2012 |
| WO | 2012118188 A2 | 9/2012 |

OTHER PUBLICATIONS

International Search Report (ISR) and Written Opinion (WO) dated Jul. 8, 2014 issued in International Application No. PCT/JP2014/002227.
Nobuyoshi Baba, et al., "Electrochromic Display", Sangyo Tosho Co., Ltd.
Norihisa Kobayashi, "Various Display Methods for Electronic Paper, and Problems and Countermeasures for Practical Realization", Chapter 7, Technical Information Institute Co., Ltd.
Baba, et al., "Electrochromic Display", Sangyo Tosho Co., Ltd.
Chinese Office Action dated Nov. 1, 2017 issued in counterpart Chinese Application No. 201480022965.9.

* cited by examiner

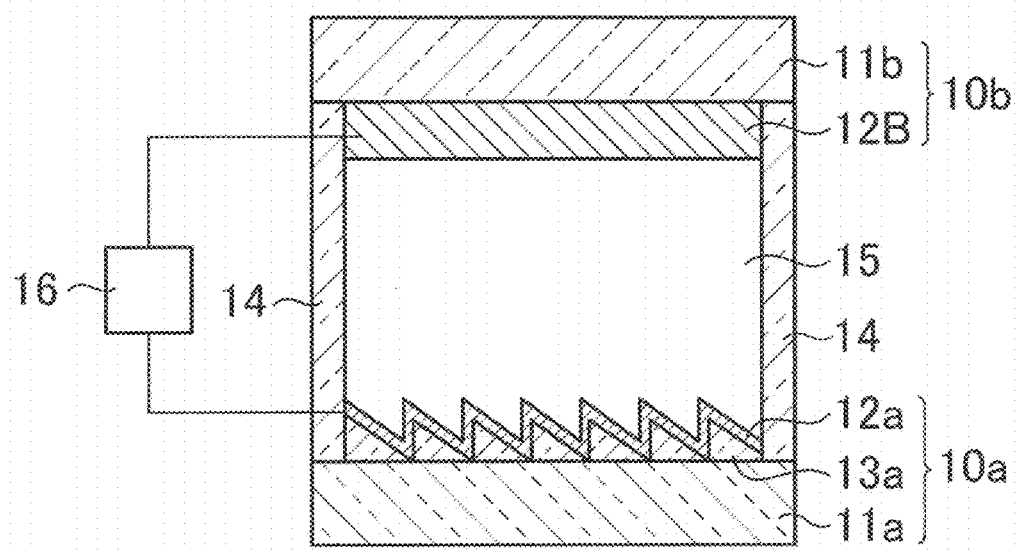

25 26 27

25 26 27

25 26 27

30 31 32

ELECTRODEPOSITION ELEMENT AND MIRROR DEVICE

CROSS REFERENCE TO RELATED APPLICATION

This application is based on and claims priority of PCT Application PCT/JP2014/002227 filed on Apr. 21, 2014, the entire contents of which are incorporated herein by reference.

FIELD

The present invention relates to an electrodeposition element and a mirror device.

BACKGROUND

An electrochromic display (ECD) is known as a non-emissive display utilizing color changes of a substance, which are generated through electrochemical reversible reactions (electrolytic oxidation-reduction reactions) upon application of voltages.

Reflectance and transmittance of a display element can be electrically controlled by employing the electrochromic technique (see, e.g., "Electrochromic Display" (Nobuyoshi Baba, et al., Sangyo Tosho Co., Ltd.), and "Various Display Methods for Electronic Paper, and Problems and Countermeasures for Practical Realization" (Norihisa Kobayashi, Chapter 7, TECHNICAL INFORMATION INSTITUTE CO., LTD.). The electrochromic display has a cell structure basically similar to those of a liquid crystal display and an electrophoretic display. In the cell structure, an electrolytic layer including an electrochromic material is disposed between electrodes. There are various cell structures depending on differences in electrochromic materials, etc.

Among electrochromic materials (i.e., materials causing electrochemical oxidation or reduction reaction upon application of a voltage, and producing color change, such as color development or color vanishment), a material of which part precipitates and deposits on the electrode (i.e., undergoes electrodeposition) or disappears from the electrode due to the oxidation or reduction reaction is called an electrodeposition material. An element using the electrodeposition material is called an electrodeposition element.

Applications of the electrodeposition elements to a display device and light control glass (smart window) have been studied. In elements using the electrodeposition materials containing silver such as $AgNO_3$, $AgClO_4$ or $AgBr$, however, Ag deposited surfaces tend to become blackish in many cases, and it has been difficult to obtain mirror (specular) reflection.

The inventors of this application have succeeded in forming a mirror reflection film, which has a high reflectance, by employing an electrodeposition material containing silver (see, e.g., Japanese Unexamined Patent Application Publication No. 2012-181389). The technique disclosed in that Publication has no particular problems, but proposals and studies on use of the electrodeposition elements in other applications than the display device and the light control glass are not discussed in that Publication.

FIG. 15 is a schematic representation illustrating a structure of a vehicle room mirror (in-vehicle rearview mirror). The vehicle room mirror illustrated in FIG. 15 is a manual antidazzle mirror capable of reducing dazzle emitted from headlights of a succeeding vehicle in the night. The vehicle room mirror includes, for example, a sheet of glass 30, a half-mirror 31, and a mirror 32. In the vehicle room mirror, duplex imaging is utilized to manually switch over a state where a relatively bright image is obtained, and a state where a relatively dark image is obtained. However, when the above-mentioned two states are manually switched over while driving, a safety problem may occur.

Although antidazzle mirrors using electrochromic elements have been proposed, the electrodeposition elements are not used in the proposed antidazzle mirrors.

SUMMARY OF THE INVENTION

An object of the present invention is to provide an electrodeposition element that has a novel structure, and that can change an advancing direction of incident light into a plurality of different directions depending on conditions of voltage application, for example, and to further provide a mirror device using the electrodeposition element.

According to one aspect of the present invention, there is provided an electrodeposition element including a first substrate including a first member and an electrode arranged above the first member, a second substrate arranged opposite to the first substrate and including an electrode, and an electrolyte layer arranged between the electrodes of the first substrate and the second substrate, and including an electrodeposition material that contains silver, wherein, when a voltage is applied between the electrodes of the first substrate and the second substrate such that the first substrate side is negative and the second substrate side is positive, a reflective surface made of a silver thin film and reflecting light, which is incident from a direction normal to the first and second substrates, in a direction not parallel to the incident direction of the light is formed above the electrode of the first substrate.

According to another aspect of the present invention, there is provided a mirror device using the electrodeposition element described above.

According to still another aspect of the present invention, there is provided a mirror device that uses an electrodeposition element including a first substrate including an electrode, a second substrate arranged opposite to the first substrate and including an electrode, and an electrolyte layer arranged between the electrodes of the first substrate and the second substrate, and including an electrodeposition material that contains silver.

According to still another aspect of the present invention, there is provided a mirror device including an electrodeposition element operated to electrically switch over a state allowing incident light to transmit therethrough and a state reflecting the incident light, and a mirror arranged not parallel to a reflective surface that is formed when the electrodeposition element is in the state reflecting the incident light.

According the present invention, the electrodeposition element having a novel structure and enabling an advancing direction of incident light to be changed into a plurality of different directions depending on conditions of voltage application, for example, can be obtained. A mirror device using the electrodeposition element, for example, can also be obtained.

BRIEF DESCRIPTION OF DRAWINGS

FIG. 5 is a schematic sectional view of an electrodeposition element according to a second embodiment;

DESCRIPTION OF EMBODIMENTS

Figure 1A:
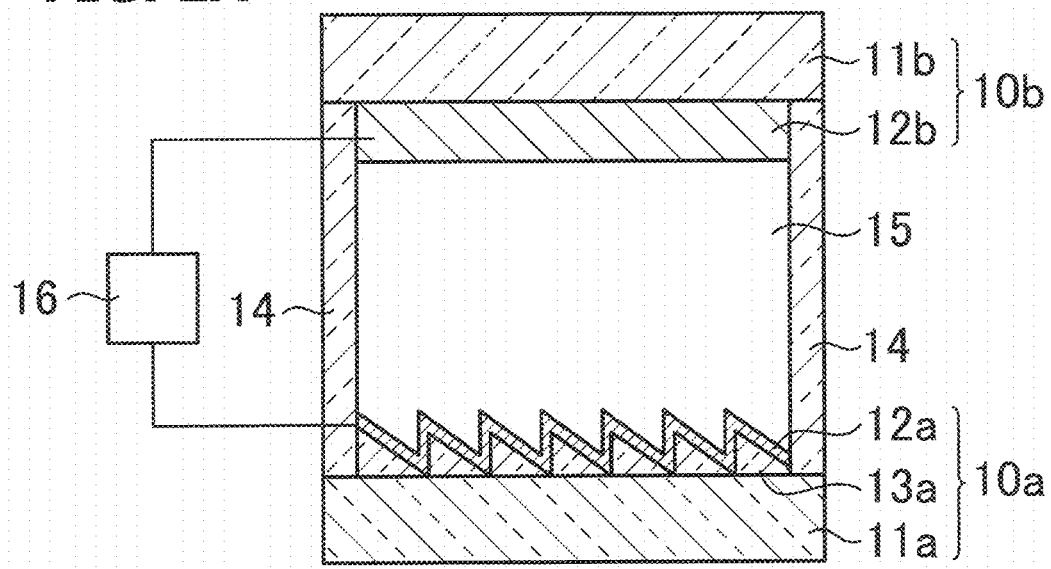
FIG. 1A is a schematic sectional view of an electrodeposition element according to a first embodiment.
Figure 1B:
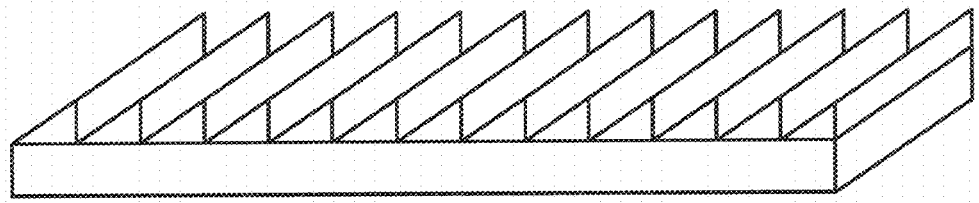
FIGS. 1B and 1C are a schematic perspective view and sectional view of a die, respectively.

FIG. 1A is a schematic sectional view of an electrodeposition element according to a first embodiment. A method of manufacturing the electrodeposition element according to the first embodiment is first described with reference to FIG. 1.

Figure 1C:
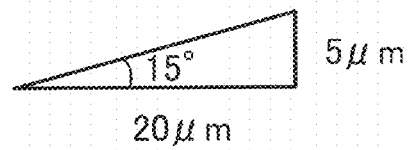

A transparent member 13a is arranged on a transparent substrate 11a that is, e.g., a glass or film substrate. In this embodiment, the transparent member 13a having a micro-prism shape was formed on the transparent substrate 11a by performing reversal transfer with use of a die having a shape substantially as per illustrated in FIG. 1B. The die has a sectional shape obtained by successively arraying right triangles, each having a base with a length of about 20 μm, a height of about 5 μm, and a base angle of about 15°, in a direction in which the base extends, as illustrated in FIG. 1C.

A predetermined amount of acrylic UV curable resin (transparent resin) is dripped onto the transparent substrate 11a. The die is placed on the UV curable resin at a predetermined position, while a thick plate of quartz, for example, is arranged at the rear side of the transparent substrate 11a. In such a reinforced state, the die is pressed against the transparent substrate 11a. After the pressing, the transparent substrate 11a is left to stand for one minute or longer, thus allowing the UV curable resin to spread sufficiently. The UV curable resin is then cured by being irradiated with an ultraviolet ray from the side facing the transparent substrate 11a (i.e., from the quartz side). In this embodiment, an irradiation amount of the ultraviolet ray was set to 2 J/cm$^2$. The irradiation amount of the ultraviolet ray may be set to an optionally selected value at which the resin is curable. Through the above-described steps, the transparent member 13a having the micro-prism shape, which corresponds to the shape of the die, is formed on the transparent substrate 11a.

The transparent substrate 11a including the transparent member 13a formed thereon is cleaned by a cleaning apparatus. In this embodiment, the cleaning was carried out in the sequence of brush washing using an alkaline detergent, washing with pure water, air blow, UV irradiation, and IR drying. However, the cleaning method is not limited to the above sequence of steps. High-pressure spray cleaning or plasma cleaning may be performed as another example.

A transparent electrode 12a is formed on the transparent member 13a by employing a transparent conductive material, e.g., ITO. In this embodiment, an ITO film was formed as the transparent electrode 12a by magnetron sputtering. However, the film-forming method is not limited to the sputtering. Patterning may be performed by employing a SUS mask, which has openings in predetermined shapes, from the viewpoint of simplification. The patterning may also be performed by photolithography.

The transparent electrode 12a desirably has lower resistance. In this embodiment, the transparent electrode 12a (ITO film) was formed in a thickness of 3000 Å to 4000 Å. However, the thickness of the transparent electrode 12a is not limited to such a range. Furthermore, a surface of the transparent electrode 12a (ITO film) is preferably in a smooth state. Accordingly, the sputtering is performed under conditions ensuring that a smooth ITO film is obtained.

A first substrate 10a including the transparent member 13a and the transparent electrode 12a successively formed on the transparent substrate 11a is fabricated as described above.

Then, a second substrate 10b is prepared by forming a transparent electrode 12b made of, e.g., ITO on a transparent substrate 11b that is a glass or film substrate. The first and second substrates 10a and 10b are arranged to form a cell structure with the transparent electrodes 12a and 12b being opposite to each other.

A gap control agent having a diameter of, e.g., 20 μm to several hundred microns, specifically 500 μm in this embodiment, is scattered over one of the substrates 10a and 10b at a density of 1 to 3 pieces/mm², for example. Depending on the diameter of the gap control agent, an amount of the scattered gap control agent is desirably set to a value at which, for example, display is hardly affected. In the case of the electrodeposition element, even when a gap variation is present to some extent, the influence upon display is small. Therefore, the amount of the scattered gap control agent is not so important. While, in this embodiment, the gap control agent was used for gap control, the gap control may be performed by utilizing a projection given by a rib, for example. In the case of a small-sized cell, the gap may be controlled by arranging a film-shaped spacer, which has a predetermined thickness, in a sealed portion.

A main seal pattern is formed on the other of the substrates 10a and 10b. In this embodiment, a sealing material 14 of the ultraviolet-ray+heat curable type was used. The sealing material 14 may be of the photo-curable type or the heat curable type. The scattering of the gap control agent and the formation of the main seal pattern may be performed on the same substrate.

Then, an electrolytic solution containing an electrodeposition material is enclosed between the substrates 10a and 10b as follows.

An ODF method was used in this embodiment. In other words, a proper amount of the electrolytic solution containing the electrodeposition material is dripped onto one of the substrates 10a and 10b. Various printing methods, such as utilizing a dispenser or an ink jet, can be employed as the dripping method. The method utilizing a dispenser was used in this embodiment. The above-mentioned sealing material 14 is preferably a sealing material resistant to (i.e., a sealing material not eroded by) the electrolytic solution used.

The substrates 10a and 10b are placed one above the other in vacuum. Those substrates may be placed one above the other in the atmosphere or a nitrogen atmosphere.

The sealing material 14 is cured by applying an ultraviolet ray at energy density of, e.g., 3 J/cm² to the sealing material 14. An SUS mask is used such that the ultraviolet ray is applied only to the sealing material 14.

The electrolytic solution containing the electrodeposition material includes the electrodeposition material (e.g., $AgNO_3$), an electrolyte (e.g., TBABr), a mediator (e.g., $CuCl_2$), an electrolyte cleaner (e.g., LiBr), a solvent (e.g., DMSO; dimethyl sulfoxide), a gelling polymer (e.g., PVB; polyvinyl butyral), etc. In this embodiment, an electrolyte layer in a gel (jelly) state was obtained by adding, to DMSO as the solvent, 50 mM of $AgNO_3$ as the electrodeposition material, 250 mM of LiBr as a support electrolyte, and 10 mM of $CuCl_2$ as the mediator, and further adding 10 wt % of PVB as a host polymer to the above mixture.

For example, $AgNO_3$, $AgClO_4$ or AgBr containing silver can be used as the electrodeposition material.

The support electrolyte is not limited to particular one insofar as it promotes the oxidation and reduction actions, etc. of the electrodeposition material. Suitable examples of the support electrolyte are lithium salts (e.g., LiCl, LiBr, LiI, $LiBF_4$, and $LiClO_4$), potassium salts (e.g., KCl, KBr, and KI), and sodium salts (e.g., NaCl, NaBr, and NaI). A concentration of the support electrolyte is preferably, for example, 10 mM or more and 1 M or less, but the concentration is not limited to a particular range.

The solvent is not limited to particular one insofar as it is able to stably hold the electrodeposition material, etc. For example, a polar solvent, such as water or propylene carbonate, an organic solvent having no polarity, an ionic liquid, an ionic conductive polymer, and a polymer electrolyte can be used optionally. More specifically, propylene carbonate, N,N-dimethylformamide, tetrahydrofuran, acetonitrile, polyvinyl sulfate, polystyrene sulfonate, polyacrylic acid, etc. can also be suitably used instead of DMSO.

The electrodeposition element according to the first embodiment includes the first and second substrates 10a and 10b that are arranged, for example, substantially parallel to each other in a oppositely spaced relation, and an electrolyte layer 15 arranged between both the substrates 10a and 10b.

The first substrate 10a includes the transparent substrate 11a, the transparent member 13a having the micro-prism shape and formed on the transparent substrate 11a, and the transparent electrode 12a formed on the transparent member 13a. The transparent electrode 12a is formed in a shape corresponding to the surface shape of the transparent member 13a, namely it is formed over the transparent member 13a having the micro-prism shape along an oblique side and an opposite side relative to the base angle of 15° of each micro-prism.

The second substrate 10b includes the transparent substrate 11b, and the transparent electrode 12b formed on the transparent substrate 11b.

The electrolyte layer 15 is confined within a region surrounded by the sealing material 14 between the first substrate 10a and the second substrate 10b. The refractive index of the electrolyte layer 15 is substantially equal to that of the transparent member 13a, and it is about 1.51, for example.

A power supply 16 capable of applying a voltage between the substrates 10a and 10b (specifically, between the electrodes 12a and 12b) is connected to the substrates 10a and 10b. When a DC voltage is applied between the substrates 10a and 10b from the power supply 16, a silver thin film derived from $AgNO_3$ (electrodeposition material) is formed on one of the electrodes 12a and 12b on the side to which a negative voltage is applied. The silver thin film disappears from the one of the electrodes 12a and 12b upon release of the applied voltage or application of a voltage having an opposite polarity.

With observation of the electrodeposition element according to the first embodiment by the inventors of this application, the electrolyte layer 15 was almost transparent in an initial state. While the electrolyte layer 15 appeared slightly yellowish, such a color is thought as being attributable to the color of $CuCl_2$ that is the mediator. The electrolyte layer 15 can be made colorless and transparent by employing a different material as the mediator, or by reducing a cell thickness.

Figure 2A:
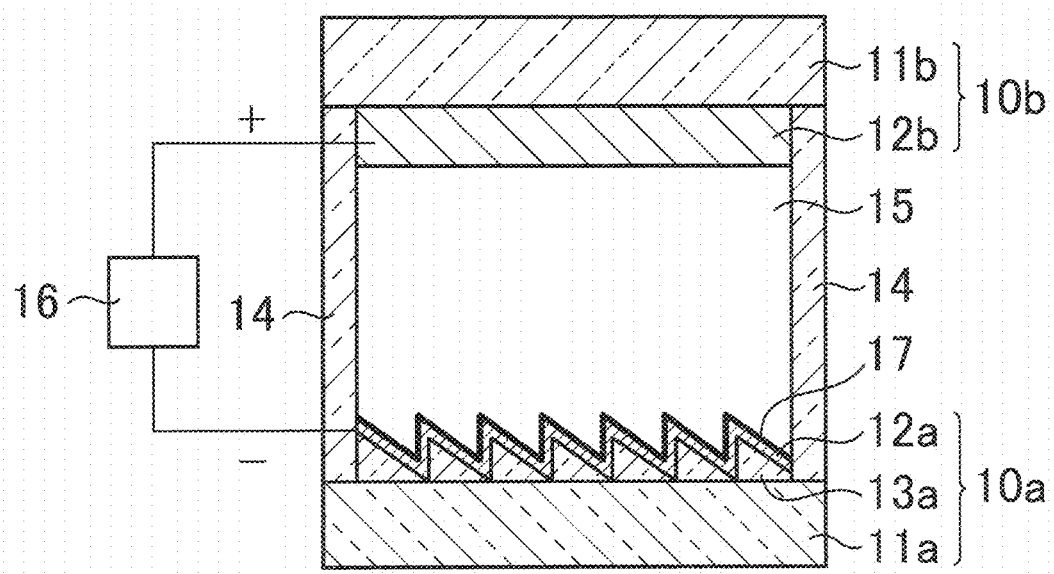
FIG. 2A is a schematic sectional view of the electrodeposition element according to the first embodiment in a state where a DC voltage is applied with the first substrate 10a side being negative and the second substrate 10b side being positive.

FIG. 2A is a schematic sectional view illustrating a state where a DC voltage is applied such that the side including the first substrate 10a is negative and the side including the second substrate 10b is positive. In this embodiment, a DC voltage of −2.5 V was applied to the transparent electrode 12a.

Upon the application of the voltage, silver ions contained in the electrolyte layer 15 are changed to metal silver in the vicinity of the transparent electrode 12a, and the silver is precipitated and deposited on the transparent electrode 12a. As a result, a silver thin film (mirror surface) 17 is formed.

Figure 2B:
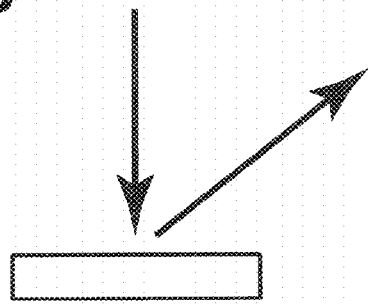
FIG. 2B is a schematic representation illustrating an advancing direction of incident light in the state of FIG. 2A.

It was confirmed that, when light was incident on the electrodeposition element from the side facing the substrate 10b in a direction normal to the substrate, the incident light was specularly reflected in a direction not parallel to the incident direction as illustrated in FIG. 2B. In other words, the incident light is reflected in the direction not parallel to the incident direction by the silver thin film (mirror surface) 17 that is formed above individual oblique surfaces of the transparent member 13a having the micro-prism shape.

Figure 3A:
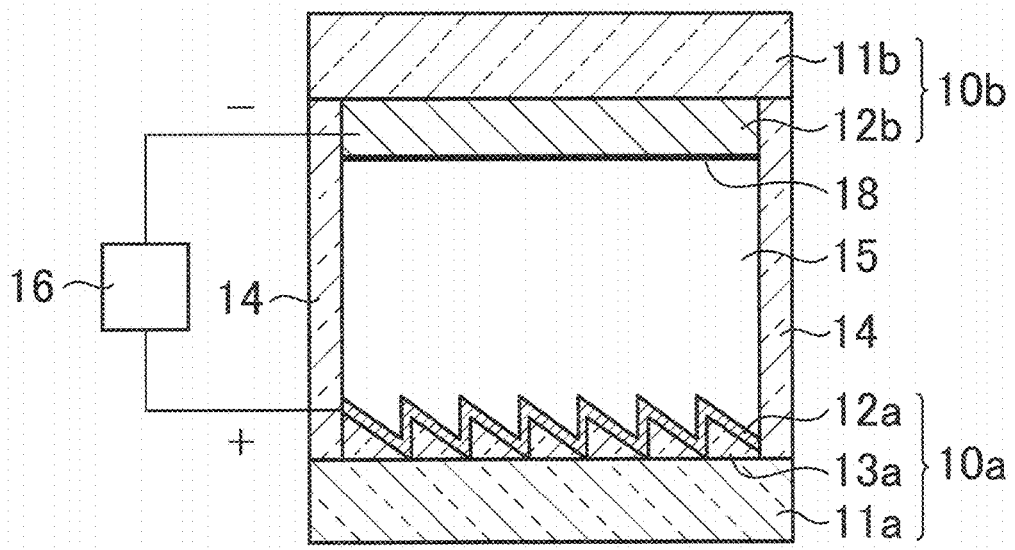
FIG. 3A is a schematic sectional view of the electrodeposition element according to the first embodiment in a state where a DC voltage is applied with the first substrate 10a side being positive and the second substrate 10b side being negative.

FIG. 3A illustrates a state where a DC voltage is applied such that the side including the first substrate 10a is positive and the side including the second substrate 10b is negative. In this embodiment, a DC voltage of +2.5 V was applied to the transparent electrode 12a.

Upon the application of the voltage, silver ions contained in the electrolyte layer 15 are changed to metal silver in the vicinity of the transparent electrode 12b, and the silver is precipitated and deposited on the transparent electrode 12b. As a result, a silver thin film (mirror surface) 18 is formed.

Figure 3B:
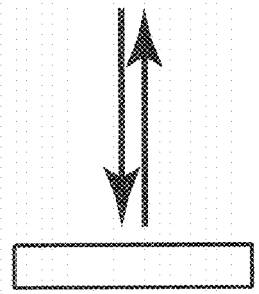
FIG. 3B is a schematic representation illustrating an advancing direction of incident light in the state of FIG. 3A.

It was confirmed that, when light was incident on the electrodeposition element from the side facing the substrate 10b in the direction normal to the substrate, the incident light was specularly (regularly) reflected in a direction opposed to the incident direction as illustrated in FIG. 3B. In other words, the incident light is reflected in the direction opposed to the incident direction by the silver thin film (mirror surface) 18.

Thus, in the electrodeposition element according to the first embodiment, the direction in which incident light, e.g., light incident from the direction normal to the first and second substrates 10a and 10b, is reflected can be changed by changing the polarity of the voltage applied to the substrates 10a and 10b. Moreover, because light incident on the element in a voltage not-applied state transmits through the element substantially straightforward, the electrodeposition element according to the first embodiment is able to change an advancing direction of the incident light into at least three different directions depending on conditions of voltage application. Accordingly, the electrodeposition element according to the first embodiment can be used as, for example, an optical control element.

It is to be noted that, when light is incident on the electrodeposition element according to the first embodiment from the side facing the substrate 10a, an advancing direction of the incident light can also be changed into a plurality of different directions depending on conditions of voltage application.

Figure 4A:
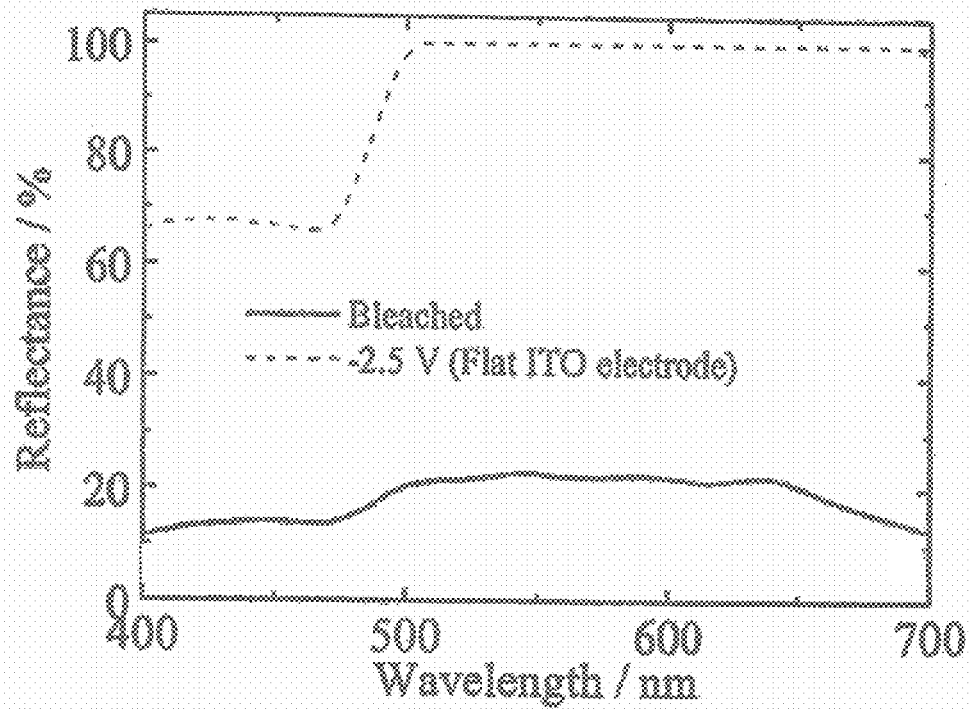
FIGS. 4A and 4B are graphs depicting optical characteristics of the electrodeposition element according to the first embodiment.
Figure 4B:
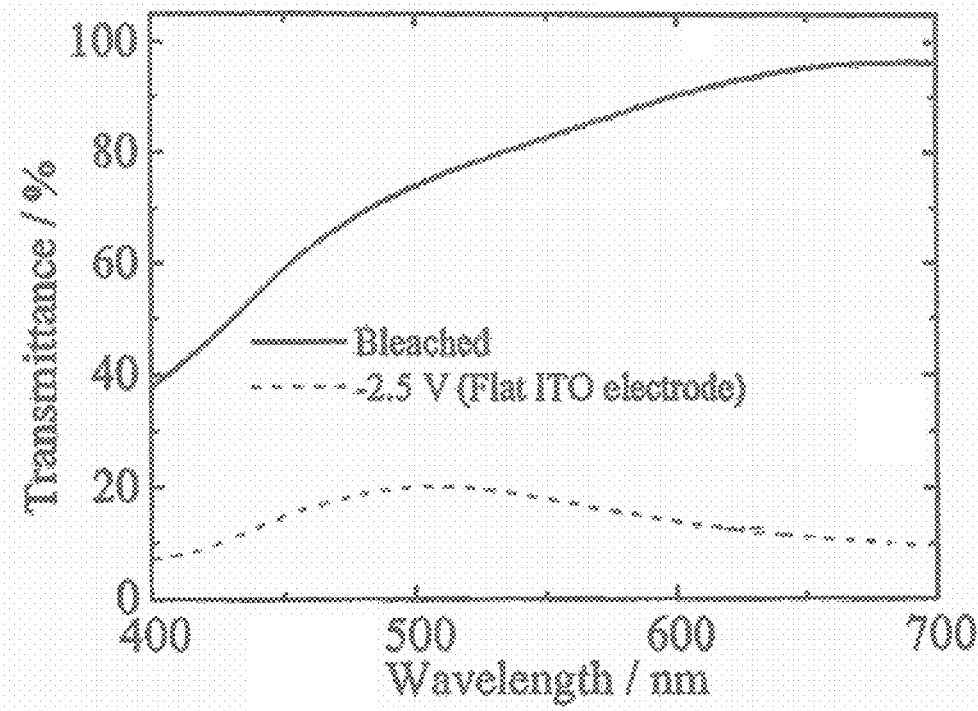

FIGS. 4A and 4B are graphs depicting optical characteristics of the electrodeposition element according to the first embodiment. FIG. 4A depicts dependency of reflectance upon wavelength when the light is incident on the element from the side facing the substrate 10b in the direction normal to the substrate, and FIG. 4B depicts dependency of transmittance upon wavelength. A horizontal axis of each graph indicates the wavelength in units of "nm", while vertical axes of FIGS. 4A and 4B indicate respectively the reflectance and the transmittance in "%". A curve denoted by a solid line indicates the reflectance or the transmittance in the state where no voltage is applied, and a curve denoted by a dotted line indicates the reflectance or the transmittance in the state where a DC voltage of +2.5 V is applied to the substrate 10a (i.e., in the state illustrated in FIG. 3A).

Referring to the curve denoted by the dotted line in FIG. 4A, it is seen that high reflectance is obtained over a wide wavelength range with the presence of the silver thin film 18 formed on the electrode 12b. Referring to the curve denoted by the solid line, the light of about 10% to 20% is reflected irrespective of wavelength when no voltage is applied.

Referring to the curve denoted by the solid line in FIG. 4B, the transmittance has slight dependency upon wavelength when no voltage is applied, and there appears a relation that the transmittance reduces at shorter wavelength. From the transmittance curve, it is understood that the element becomes yellowish when no voltage is applied. Such a color is thought as being attributable to the color of $CuCl_2$ that is the mediator. The above phenomenon can be suppressed by reducing the cell thickness.

Referring to the curve denoted by the dotted line in FIG. 4B, it is seen that the light of about 10% to 20% (light of at least 10% in average) transmits (penetrates) through the element irrespective of wavelength. Such penetration of the light may be reduced by modifying drive conditions or the constitution of the electrolyte layer. For example, the penetration of the light may be suppressed by increasing the voltage applied to the element, or by prolonging a voltage application time. However, such a case raises the problem that a longer time is required for return to a transparent state (i.e., a state where silver has been oxidized to $Ag^+$ and has disappeared from the electrode). The return to the transparent state can be promoted, though the yellowish color is thickened, by increasing an amount of $CuCl_2$ added as the mediator.

In the electrodeposition element according to the first embodiment, when a DC voltage of −2.5 V is applied to the substrate 10a, for example, the light incident from the direction normal to the substrates transmits through the element at 10% or more as in the above-mentioned case.

FIG. 5 is a schematic sectional view of an electrodeposition element according to a second embodiment. The second embodiment is different from the first embodiment in that the second substrate 10b includes a reflective electrode 12B.

The electrodeposition element according to the second embodiment can be manufactured substantially in the same manner as in the first embodiment. Different points reside in that the second substrate 10b is prepared in a state where the electrode 12B made of a metal, e.g., aluminum or silver and specularly reflecting light is formed on the substrate 11b, and that the ultraviolet ray is applied to the sealing material 14 from the side including the first substrate 10a in the cell forming step.

The electrolyte layer 15 in the electrodeposition element according to the second embodiment was also almost transparent in an initial state. While the electrolyte layer 15 appeared slightly yellowish, such a color is thought as being attributable to the color of $CuCl_2$ that is the mediator. The electrolyte layer 15 can be made colorless and transparent by employing a different material as the mediator, or by reducing a cell thickness.

In the electrodeposition element according to the second embodiment, when no voltage is applied, light incident on the electrodeposition element from the side facing the substrate 10a in the direction, for example, normal to the substrate is specularly (regularly) reflected by the reflective electrode 12B in a direction opposed to the incident direction. When a DC voltage is applied such that the side including the first substrate 10a is negative and the side including the second substrate 10b is positive, a silver thin film (mirror surface) is formed on the electrode 12a, the light incident from the direction normal to the substrate is reflected in a direction not parallel to the incident direction by the silver thin film (mirror surface) that is formed above the individual oblique surfaces of the transparent member 13a having the micro-prism shape.

Thus, the electrodeposition element according to the second embodiment can also change the direction in which incident light, e.g., light incident on the element from the side facing the substrate 10a in the direction normal to the substrate, is reflected (i.e., change an advancing direction of the incident light) depending on conditions of voltage application.

When a DC voltage is applied to the electrodeposition element according to the second embodiment such that the side including the first substrate 10a is positive and the side including the second substrate 10b is negative, a silver thin film (mirror surface) is formed on the reflective electrode 12B. The formation of the silver thin film realizes substantially the same optical state as that when no voltage is applied. Comparing with the first embodiment, therefore, current control for eliminating the silver thin film formed on the transparent electrode 12a, for example, is not required to be performed exactly, and the silver thin film can be eliminated more readily.

In the second embodiment, an opaque substrate, for example, may be used instead of the transparent substrate 11b.

The electrodeposition element according to the second embodiment can also be used as an optical control element. The electrodeposition element can be applied to, e.g., a vehicle room mirror (in-vehicle rearview mirror) with an antidazzle function.

Figure 6A:
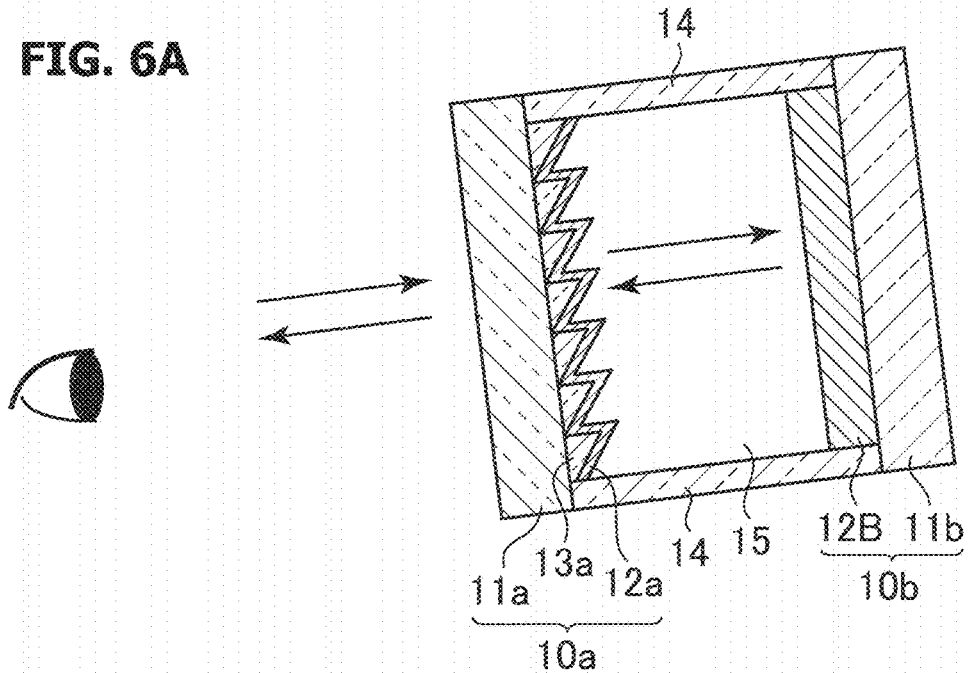
FIGS. 6A and 6B are each a schematic representation illustrating an advancing direction of light incident on a vehicle room mirror that uses the electrodeposition element according to the second embodiment.

As illustrated in FIG. 6A, when no voltage is applied, incident light on the room mirror is reflected at a high reflectance by the reflective electrode 12B, and a driver can clearly view, for example, the rear (namely, the room mirror is in a state where a relatively bright image is obtained).

Figure 6B:
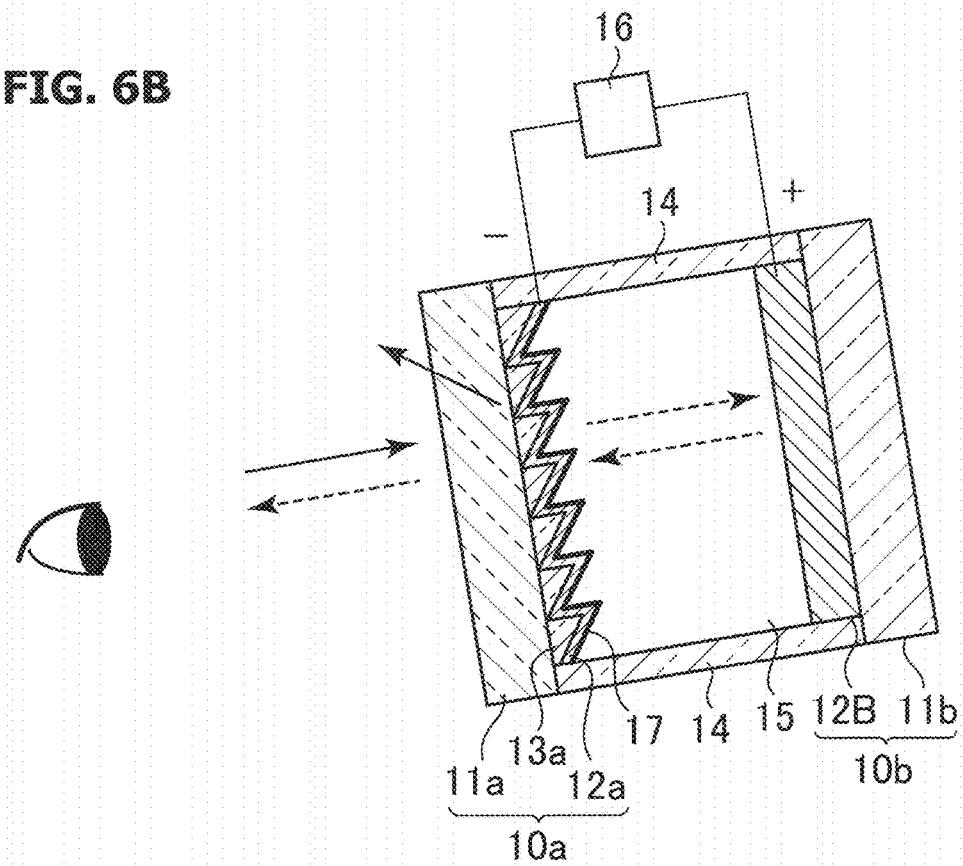

When a DC voltage is applied such that the side including the first substrate 10a is negative and the side including the second substrate 10b is positive, the silver thin film (mirror surface) 17 is formed on the electrode 12a as illustrated in FIG. 6B. Large part of the incident light on the room mirror is reflected in a direction not parallel to the incident direction by the silver thin film (mirror surface) 17, and is not incident on the eyes of the driver. The remaining small part of the incident light on the room mirror transmits through the silver thin film (mirror surface) 17, and after being reflected by the reflective electrode 12B, enters the silver thin film (mirror surface) 17. Part of the light entering the silver thin film (mirror surface) 17 and transmitting through it again is incident on the eyes of the driver.

A percentage of light transmitting through the silver thin film (mirror surface) 17 is about 10% to 20%, for example. Accordingly, about several percentages of the incident light on the room mirror enters the eyes of the driver (namely, the room mirror is in a state where a relatively dark image is obtained).

Figure 7A:
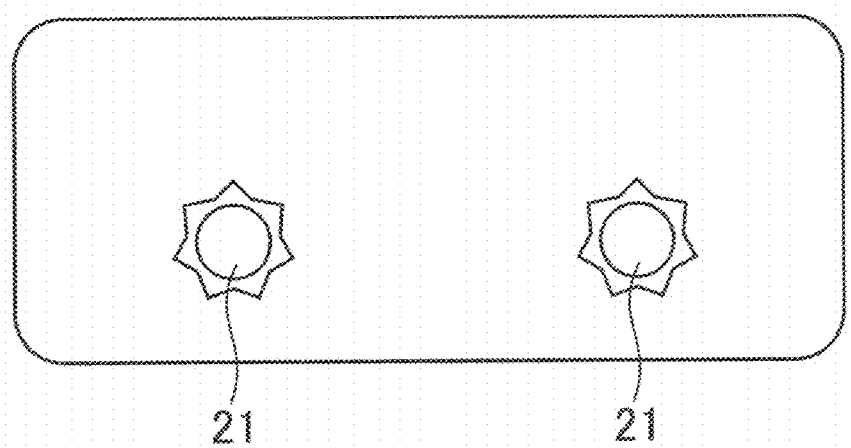
FIGS. 7A and 7B are each a schematic representation illustrating headlights of a succeeding vehicle, the headlights being seen in the vehicle room mirror 20.
Figure 7B:
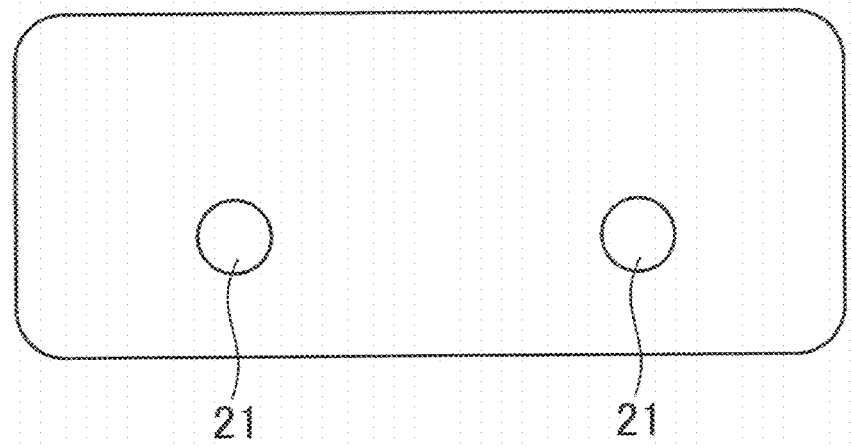

FIGS. 7A and 7B are each a schematic representation illustrating headlights 21 of a succeeding vehicle, the headlights being seen in a vehicle room mirror (in-vehicle rearview mirror) 20.

When no voltage is applied (i.e., in the state illustrated in FIG. 6A), the driver can clearly view the rear. However, the driver often feels dazzle the headlights 21 of the succeeding vehicle as illustrated in FIG. 7A. In such a case, by applying a DC voltage such that the side including the first substrate 10a is negative and the side including the second substrate 10b is positive (i.e., in the state illustrated in FIG. 6B), an amount of the light incident on the eyes of the driver can be reduced (attenuated) and the antidazzle effect can be developed as illustrated in FIG. 7B.

Switching between the state where a relatively bright image is obtained (i.e., the state illustrated in FIG. 7A) and the state where a relatively dark image is obtained (i.e., the state illustrated in FIG. 7B) is automatically performed by employing an optical sensor, for example. Switching control is made, for example, by applying a DC voltage such that the side including the first substrate 10a is negative and the side including the second substrate 10b is positive, when an amount of light detected by the optical sensor is not less than a threshold, and by releasing the application of the DC voltage or applying a DC voltage having opposite polarity when the amount of the detected light is less than the threshold. The switching may be manually performed, but automatic switching is desirable from the viewpoint of safety.

An extent of attenuation of light can be controlled depending on a voltage value applied to the electrodeposition element or a voltage application time. It is also possible to perform an adjustment in a manner of attenuating the light to such an extent as making the headlights 21 of the succeeding vehicle not dazzle, thus allowing the drive to visually confirm the state in the rear. Such control contributes to improving safety while driving, for example.

From the viewpoint of application to the antidazzle mirror, the penetration of light through the silver thin film (mirror surface) at about 10% to 20%, for example, is thought as being preferable.

The electrodeposition element according to the first embodiment can also be applied to the vehicle room mirror in a state where the first substrate 10a provides an incident surface, by applying a DC voltage in an ordinary state such that the side including the first substrate 10a is positive and the side including the second substrate 10b is negative.

Figure 8A:
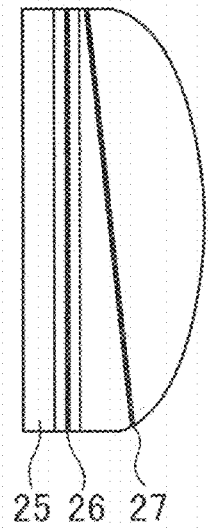
FIG. 8A is a schematic representation illustrating another structural example of the vehicle room mirror with an antidazzle function.

FIG. 8A illustrates another structural example of the vehicle room mirror with the antidazzle function. The vehicle room mirror illustrated in FIG. 8A includes an electrodeposition element 26 and a mirror 27. The electrodeposition element 26 can be electrically switched over, for example, between a state allowing light incident from the side including a sheet of glass 25 to transmit therethrough and a state regularly reflecting the incident light. A reflective surface of the electrodeposition element 26 and a reflective surface of the mirror 27 are arranged not parallel to each other.

Figure 8B:
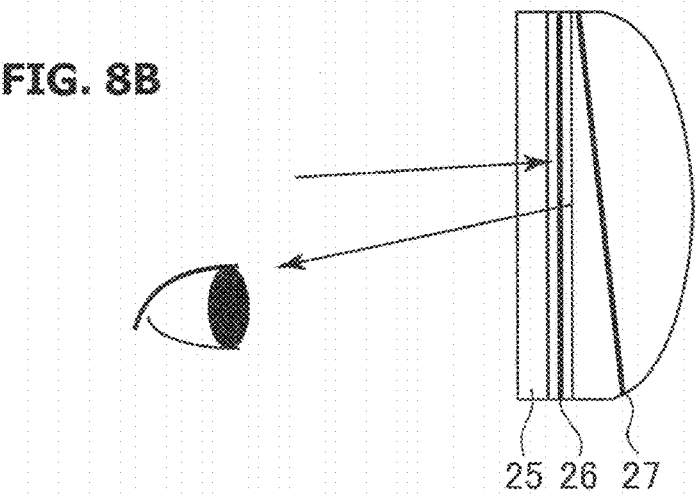
FIGS. 8B and 8C are each a schematic representation illustrating an advancing direction of light incident on the vehicle room mirror of FIG. 8A.

In the state where the electrodeposition element 26 allows the transmission of light, the incident light on the room mirror is reflected by the mirror 27 to enter the eyes of the driver as illustrated in FIG. 8B (namely, the room mirror is in a state where a relatively bright image is obtained).

Figure 8C:
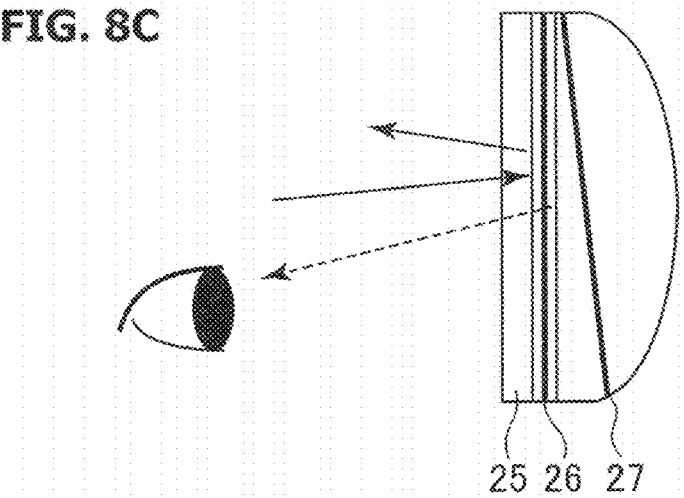

In the state where the electrodeposition element 26 regularly reflects light, part of the incident light transmits through a regularly reflecting surface formed on the electrodeposition element 26, and after being reflected by the mirror 27, part of the reflected light enters the eyes of the driver as illustrated in FIG. 8C (namely, the room mirror is in a state where a relatively dark image is obtained).

For example, the electrodeposition element according to the first embodiment can be used as the electrodeposition element 26. In one example of control, the light transmission state is realized by applying no voltage, and the state regularly reflecting light is realized by applying a DC voltage such that the side including the first substrate 10a is positive and the side including the second substrate 10b is negative.

Alternatively, the electrodeposition element 26 may be constituted as an electrodeposition element in which the transparent member 13a is not formed and the transparent electrode 12a is formed, for example, directly on the transparent substrate 11a.

As seen from comparing FIGS. 6B and 8C, however, the incident light on the room mirror can be reflected at a larger reflection angle in the case where the transparent member 13a having the micro-prism shape is disposed and the silver thin film (mirror surface) 17 formed above the transparent member 13a is utilized as the reflection surface. Accordingly, the size, thickness and weight of the vehicle room mirror can be reduced more easily in that case.

Figure 9A:
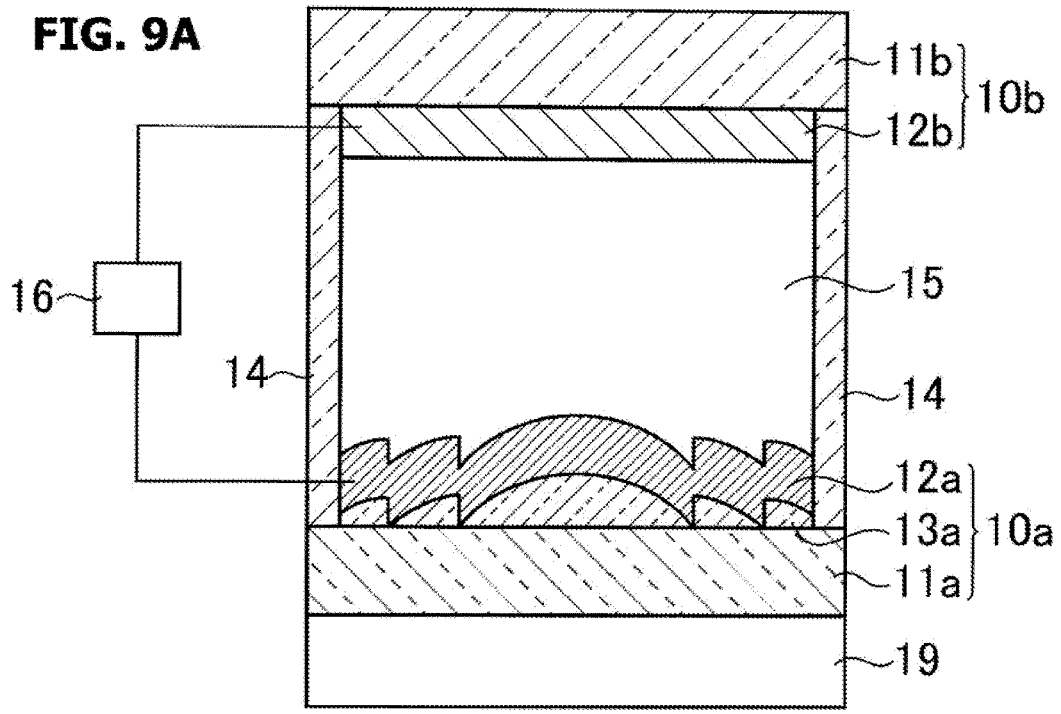
FIG. 9A is a schematic sectional view of an electrodeposition element according to a third embodiment.

FIG. 9A is a schematic sectional view of an electrodeposition element according to a third embodiment. The transparent member 13a is formed in the micro-prism shape in the first and second embodiments, but in the third embodiment a transparent member 13a is formed in the shape of a Fresnel lens with a plane lens function. In addition, a mirror 19 is arranged outside the first substrate 10a (at a surface of the first substrate 10a on the side opposite to a surface on which the transparent member 13a is formed).

The electrodeposition element according to the third embodiment is manufactured as follows.

Figure 9B:
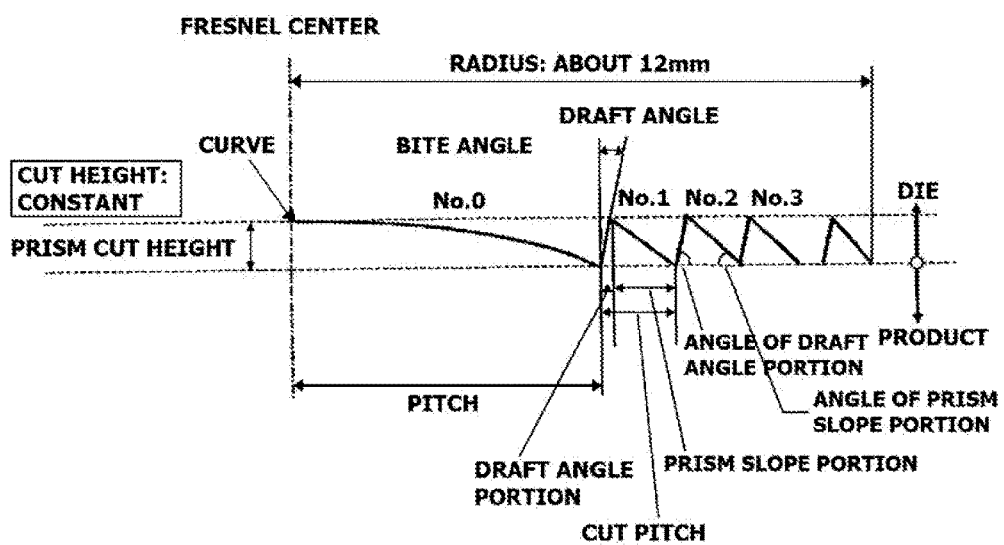
FIG. 9B is a schematic representation illustrating a sectional shape of a transparent member 13a in the electrodeposition element according to the third embodiment.

The transparent member 13a (micro-Fresnel lens) is disposed on a transparent substrate 11a that is, e.g., a glass or film substrate. The transparent member 13a in the shape of a Fresnel lens has a concentric planar shape and a sectional shape illustrated in FIG. 9B, for example, and it is formed through reversal transfer using a precision die.

More specifically, a predetermined amount of acrylic UV curable resin (transparent resin) is dripped onto the transparent substrate 11a (center region of a die pattern) by employing a precision dispenser. The precision die is placed on the UV curable resin at a predetermined position, while a thick plate of quartz, for example, is arranged at the rear side of the transparent substrate 11a. In such a reinforced state, the die is pressed against the transparent substrate 11a. If a speed of pressing the die against the substrate 11a is fast, bubbles having diameters of 50 μm to 200 μm tend to remain between the resin and the die pattern. To avoid the bubbles from remaining, in this embodiment, the resin was spread in a state free from the bubbles between the resin and the die by performing the pressing a little by a little for a relatively long time while allowing the bubbles to escape. The barometric pressure during the pressing is preferably set to a lower level. The pressing speed can be increased at lower barometric pressure. When the barometric pressure is about 20 Torr or less, the pressing can be performed irrespective of the pressing speed. In this embodiment, pressure applied during the pressing was held constant, and the size of the transparent member 13a was controlled depending on an amount of the dripped resin.

After the pressing, the transparent substrate 11a is left to stand for one minute or longer, thus allowing the UV curable resin to spread sufficiently. The UV curable resin is then cured by being irradiated with an ultraviolet ray from the side facing the transparent substrate 11a (i.e., from the quartz side). In this embodiment, an irradiation amount of the ultraviolet ray was set to 2 J/cm$^2$. In practice, the irradiation amount of the ultraviolet ray may be set to an optional value at which the resin is curable. Through the steps described above, the transparent member 13a having the Fresnel lens shape, which corresponds to the shape of the die, is formed on the transparent substrate 11a.

As in the first embodiment, the transparent substrate 11a including the transparent member 13a formed thereon is cleaned by a cleaning apparatus. Furthermore, as in the first embodiment, a transparent electrode 12a is formed on the transparent member 13a by employing ITO. Thus, the first substrate 10a including the transparent member 13a and the transparent electrode 12a successively formed on the transparent substrate 11a is fabricated.

Then, a second substrate 10b is prepared by forming a transparent electrode 12b made of, e.g., ITO on a transparent substrate 11b that is a glass or film substrate. The first and second substrates 10a and 10b are arranged to form a cell structure with the transparent electrodes 12a and 12b being opposed to each other. Conditions for forming the cell structure are substantially equal to those in the first embodiment.

Then, an electrolytic solution containing an electrodeposition material is enclosed between the substrates 10a and 10b through similar steps to those in the first embodiment.

Finally, the mirror 19 is attached to an external surface of the substrate 10a. A reflective surface of the mirror 19 is arranged at the side facing the substrate 10a.

The electrodeposition element according to the third embodiment is different from the electrodeposition element according to the first embodiment in that the transparent member 13a has the Fresnel lens shape and the mirror 19 is arranged outside the first substrate 10a.

The electrodeposition element according to the third embodiment before the step of arranging the mirror 19 was almost transparent in an initial state. While the electrodeposition element appeared slightly yellowish, such a color is thought as being attributable to the color of CuCl$_2$ that is the mediator. The electrodeposition element can be made colorless and transparent by employing a different material as the mediator, or by reducing a cell thickness.

The electrodeposition element according to the third embodiment before the step of arranging the mirror 19 also has similar characteristics of reflectance and transmittance to those illustrated in FIGS. 4A and 4B.

In the electrodeposition element according to the third embodiment, when no voltage is applied, light incident on the electrodeposition element from the side facing the substrate 10b in the direction, for example, normal to the substrate is specularly (regularly) reflected by the mirror 19 in a direction opposed to the incident direction. When a DC voltage is applied such that the side including the first substrate 10a is negative and the side including the second substrate 10b is positive, a silver thin film (mirror surface) is formed on the electrode 12a, and it functions as a convex mirror. Accordingly, the incident light is reflected in a direction not parallel to the incident direction.

The electrodeposition element according to the third embodiment can also change the direction in which incident light, e.g., light incident on the element from the side facing the substrate 10b in the direction normal to the substrate, is reflected (i.e., change an advancing direction of the incident light) depending on conditions of voltage application.

When a DC voltage is applied to the electrodeposition element according to the third embodiment such that the side including the first substrate 10a is positive and the side including the second substrate 10b is negative, a silver thin film (mirror surface) is formed on the transparent electrode 12b. The formation of the silver thin film realizes substantially the same optical state for light incident from the side including the substrate 10b as that when no voltage is applied. Therefore, current control for eliminating the silver thin film formed on the transparent electrode 12a, for example, is not required to be performed exactly, and the silver thin film can be eliminated more readily.

The electrodeposition element according to the third embodiment can also be used as an optical control element. The electrodeposition element can be applied to, e.g., a vehicle door mirror or a fender mirror (external rearview mirror) capable of, for example, electrically turning on/off the function of the convex mirror.

Figure 10A:
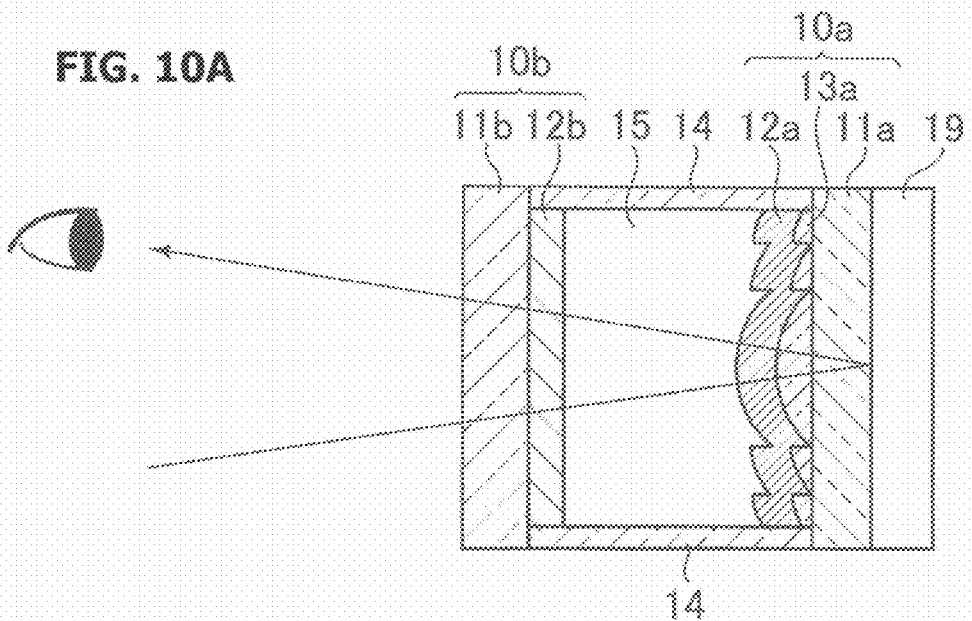
FIG. 10A is a schematic representation illustrating an advancing direction of light incident on a door mirror that uses the electrodeposition element according to the third embodiment, when no voltage is applied.

As illustrated in FIG. 10A, when no voltage is applied, incident light on the door mirror from the side including the substrate 10b, for example, is reflected by the mirror 19 at a high reflectance, and the driver can clearly view, for example, the rear and the side rear.

Figure 10B:
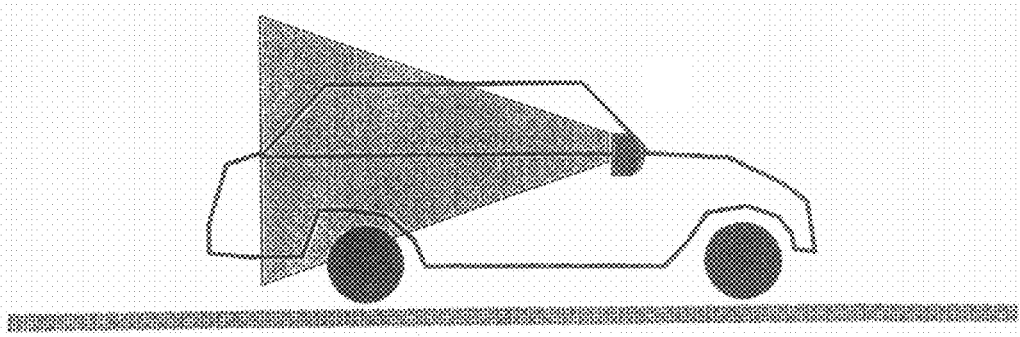
FIG. 10B is a schematic representation illustrating a range that is visually recognizable by a driver through the door mirror when no voltage is applied.

FIG. 10B illustrates a range that is visually recognizable by the driver through the door mirror when no voltage is applied. The door mirror is held in the voltage not-applied state during ordinary driving, for example, because the driver can clearly view the rear, specifically, a succeeding vehicle when no voltage is applied. However, a visual angle is relatively narrow.

Figure 11A:
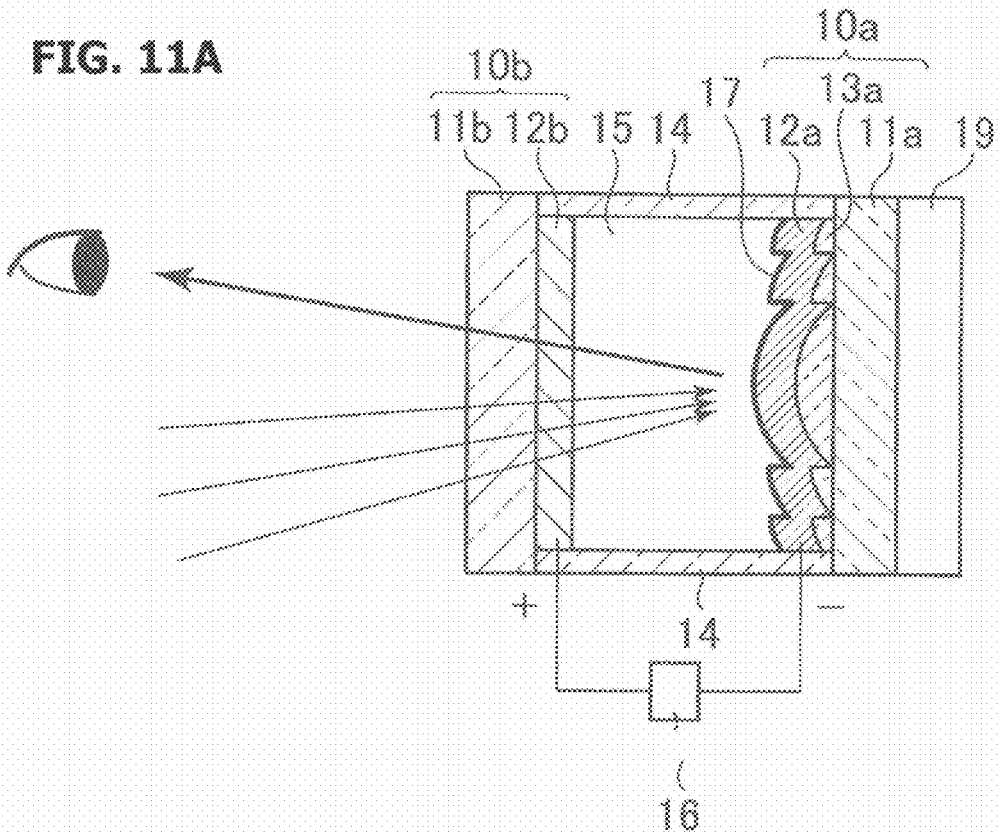
FIG. 11A is a schematic representation illustrating an advancing direction of light incident on the door mirror that uses the electrodeposition element according to the third embodiment, when a DC voltage is applied with the first substrate 10a side being negative and the second substrate 10b side being positive.

When a DC voltage of about −2.5 V, for example, is applied to the transparent electrode 12a such that the side including the first substrate 10a is negative and the side including the second substrate 10b is positive, the silver thin film (mirror surface) 17 is formed on the electrode 12a as illustrated in FIG. 11A. The silver thin film (mirror surface) 17 functions as a magnifying reflective mirror for the incident light on the door mirror.

Figure 11B:
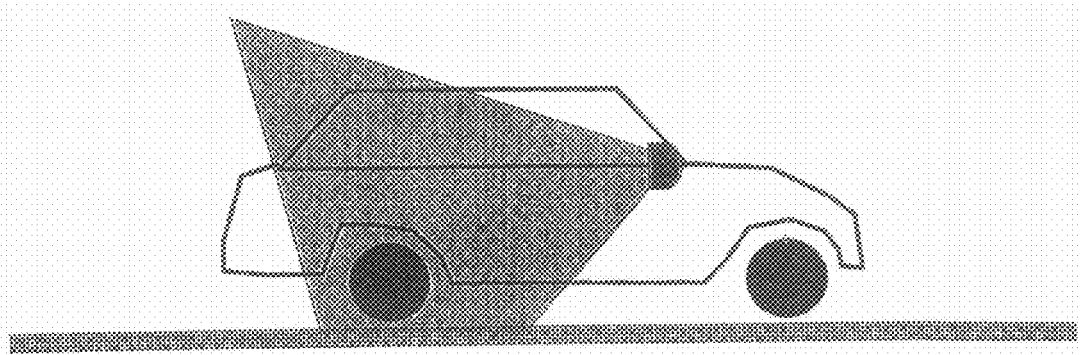
FIG. 11B is a schematic representation illustrating a range that is visually recognizable by the driver through the door mirror in the voltage applied state.

FIG. 11B illustrates a range that is visually recognizable by the driver through the door mirror in the voltage applied state described above. The driver can obtain information over a wider range of visual angle than that when no voltage is applied. While a resulting image is distorted, a range of vision extending toward the rear in a more downward inclined way, for example, can be obtained. Accordingly, safety can be increased when the driver starts up the vehicle, runs the vehicle at a low speed, and backs the vehicle.

Switching between the state where the visual angle is relatively narrow (i.e., the state illustrated in FIGS. 10A and 10B) and the state where the visual angle is relatively wide (i.e., the state illustrated in FIGS. 11A and 11B) is performed manually or automatically.

Figure 12A:
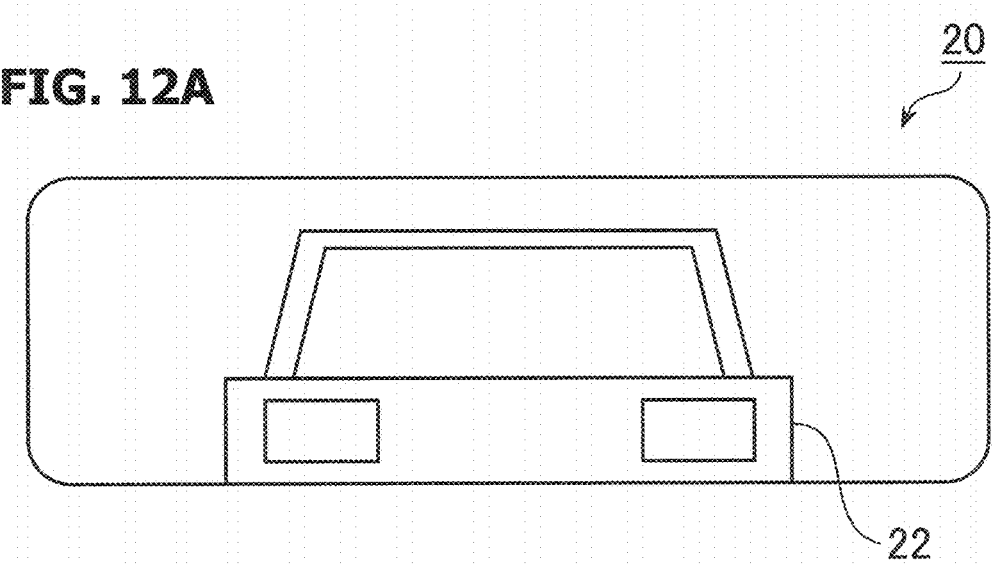
FIGS. 12A and 12B are each a schematic representation of a vehicle room mirror 20 that uses the electrodeposition element according to the third embodiment.
Figure 12B:
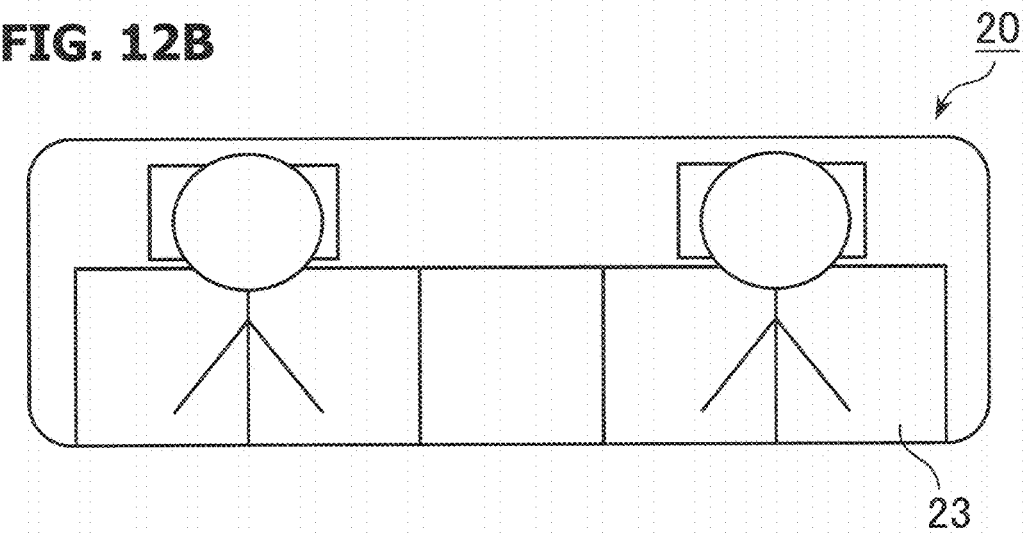

FIGS. 12A and 12B are each a schematic representation of a vehicle room mirror (in-vehicle rearview mirror) 20 that uses the electrodeposition element according to the third embodiment.

As illustrated in FIG. 12A, when no voltage is applied, the driver can clearly view a succeeding vehicle 22.

When a DC voltage is applied such that the side including the first substrate 10a is negative and the side including the second substrate 10b is positive, the silver thin film (mirror surface) 17 is formed on the electrode 12a, and it functions as the magnifying reflective mirror for the light incident on the room mirror. Accordingly, as illustrated in FIG. 12B, the driver can view a rear sheet 23 at a wider visual angle.

The electrodeposition element according to the third embodiment can be applied to not only the vehicle mirrors, but also a curve mirror installed on a road, a portable mirror (compact mirror), a dressing table, etc.

In the third embodiment, the mirror 19 is arranged outside the first substrate 10a. However, the state illustrated in FIG. 10B and the state illustrated in FIG. 11B may be selectively realized, without arranging the mirror 19, by electrically switching over the state where the incident light is reflected by the silver thin film (mirror surface with the function of a magnifying reflective mirror) 17 on the transparent electrode 12a and the state where the incident light is reflected by the silver thin film (mirror surface with the function of a plane mirror) 18 on the transparent electrode 12b, as in the first embodiment.

Alternatively, the Fresnel lens shape of the transparent member 13a may be formed in a shape vertically reversed to that in the above-mentioned case without arranging the mirror 19, and light may be incident on the electrodeposition element from the side facing the substrate 10a.

Figure 13:
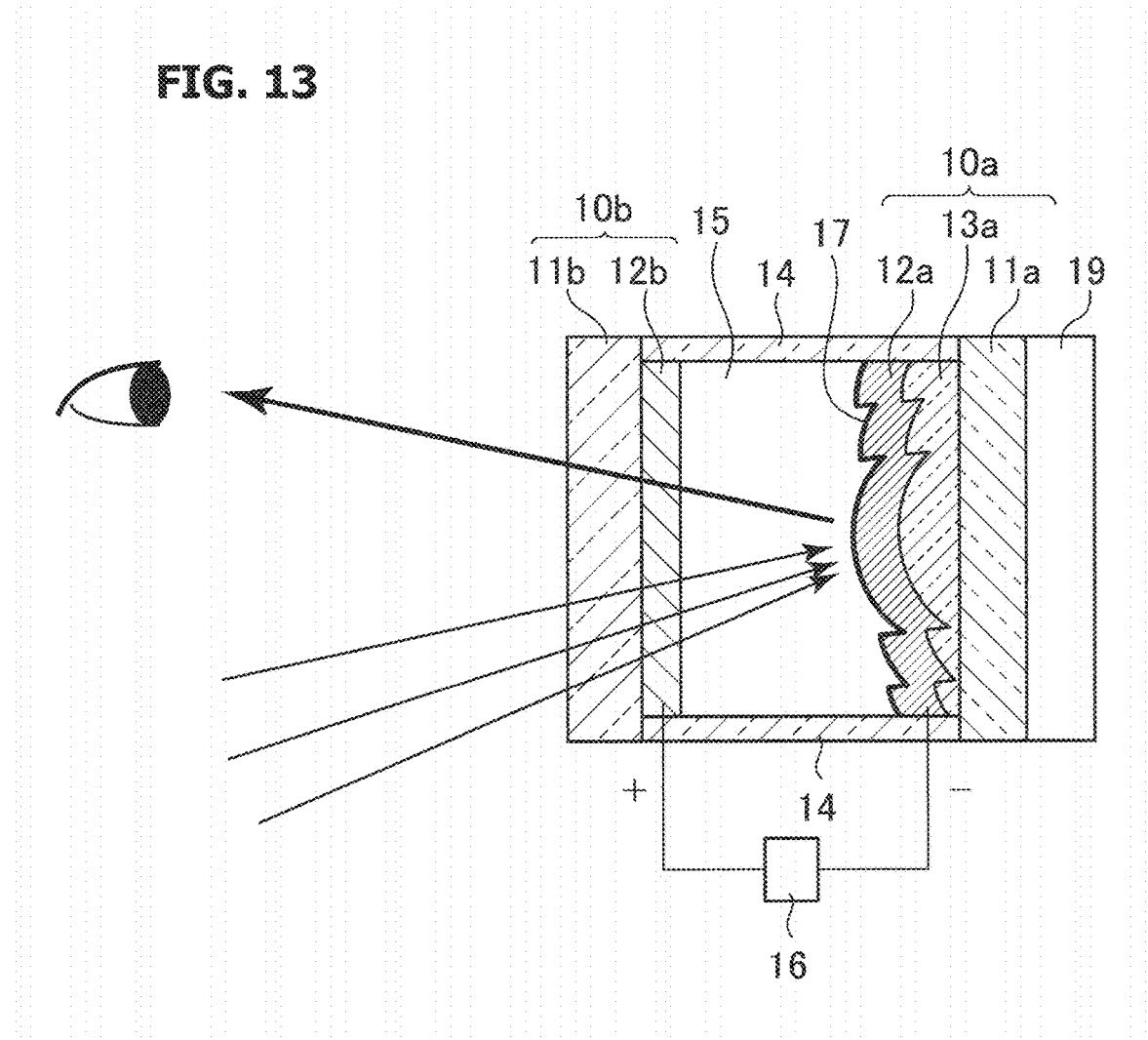
FIG. 13 is a schematic sectional view illustrating a modification of a mirror device that uses the electrodeposition element according to the third embodiment.

As another modification illustrated in FIG. 13, for example, a portion of the transparent member 13a, the portion having the Fresnel lens shape, may be formed on a surface inclined relative to the plane direction of the substrates 10a and 10b. In this modification, a wider range of visual angle extending toward the rear in a more downward inclined way can be obtained in comparison with the case illustrated in FIG. 11A. Similar advantageous effects can also be obtained with a mirror device in which the electrodeposition element according to the third embodiment is arranged in a state where the transparent electrode 12a having a shape corresponding to the surface shape of a Fresnel lens is inclined relative to the vertical direction, for example.

The present invention has been described in connection with the embodiments and the modifications, but the present invention is not limited thereto.

For example, while the bulk type element is constituted in the embodiments, an interface type element may be constituted.

While the gel-like electrolyte layer is used in the embodiments, a silver complex may be used. The electrolyte layer is constituted, for example, in the form including an electrolyte solution or an electrolyte film that contains the electrodeposition material.

In the first embodiment, for example, the first and second substrates 10a and 10b are both transparent substrates, but one of the two substrates may be an opaque substrate. As one example, one of the transparent substrates 11a and 11b may be an opaque substrate, and the electrode 12a or 12b formed above the one opaque substrate may be an opaque electrode. When the first substrate 10a is made opaque, an opaque member may be used instead of the transparent member 13a. Materials used to form the opaque electrode may be, e.g., a silver alloy, gold, copper, aluminum, nickel, molybdenum. While the transparent electrodes 12a and 12b are formed by employing ITO in the embodiments, the transparent electrodes 12a and 12b may be formed by employing a transparent conductive material other than ITO.

Figure 14:
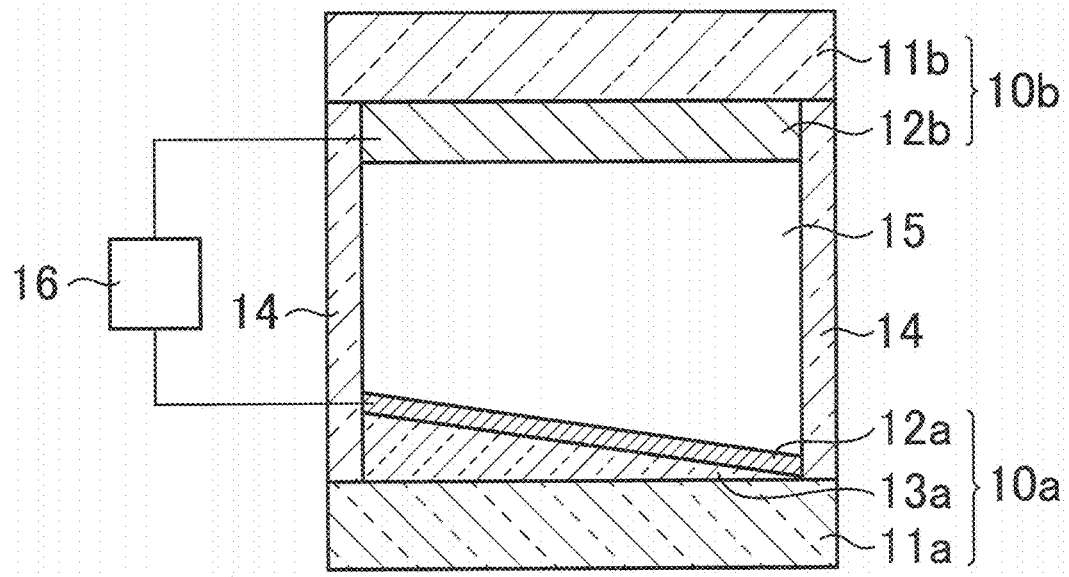
FIG. 14 is a schematic sectional view of an electrodeposition element according to a modification.
Figure 15:
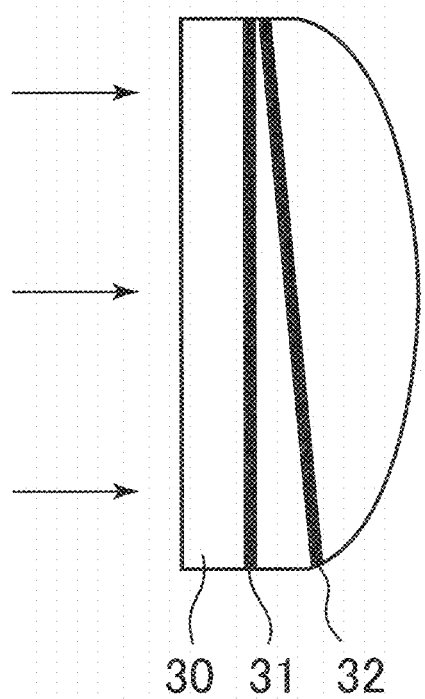
FIG. 15 is a schematic representation illustrating a structure of a vehicle room mirror.

In the embodiments, the transparent member 13a is formed in the micro-prism shape or the Fresnel lens shape. That shape includes a smooth surface (i.e., a surface in a state where the silver thin film 17 can serve as a mirror), and three-dimensional concavities and convexities having sizes in the order of micron or more, e.g., several ten microns or more. The shape of the transparent member 13a is not limited to the above-mentioned example, and the transparent member 13a may have any other suitable shape insofar as a reflective surface made of a silver thin film (i.e., an electrodeposition film) is capable of specularly reflecting light incident from the direction, for example, normal to the substrate in a direction not parallel to the incident direction. In the case of a small-sized cell, or when a large reflective angle is not required, the transparent member 13a may be formed in a planar shape without including concavities and convexities as illustrated in a modification of FIG. 14, for example. While the Fresnel lens shape is used in the third embodiment, various kinds of lens shapes may be optionally used without being limited to the Fresnel lens shape.

While, in the embodiments, the transparent member 13a having the micro-prism shape or the Fresnel lens shape is formed by performing reversal transfer with use of a die, a method of forming the transparent member 13a in that shape is not limited to the above-described one. As another example, the transparent member 13a may be formed through roll transfer.

While the embodiments have the structure in which the first substrate 10a includes the transparent member 13a, it is just required that at least one of the substrates 10a and 10b includes a member above which the reflective surface made of the silver thin film is to be formed above the electrode 12*a* or 12*b*.

Moreover, the transparent member 13*a* may be formed in a part of an inner region surrounded by the sealing material 14.

While, in the embodiments, the refractive index of the electrolyte layer 15 is set substantially equal to that of the transparent member 13*a*, the refractive indexes of both may be different from each other. The transparent member 13*a* having the micro-prism shape in each of the first and second embodiments and the transparent member 13*a* having the Fresnel lens shape in the third embodiment may be formed as electrodeposition elements that additionally have a prism function and a lens function, respectively.

It is apparent to those skilled in the art that various modifications, improvements, combinations and so on can also be made in addition to the above-described embodiments and modifications.

The electrodeposition elements according to the embodiments can be utilized as various optical elements.

The electrodeposition elements can be suitably employed in, for example, various mirror devices such as a vehicle antidazzle mirror and a visual-angle varying door mirror or room mirror, on-vehicle lightings (such as headlights and taillights), various illuminating devices such as a backlight and a strobe, and light control products for windows.

The electrodeposition elements can be applied to not only the examples mentioned above, but also to light distribution control in optical products utilizing, e.g., reflection, such as general lightings, interior lights, special lights, street lights, and surface light sources. As a result, mirror devices with light distribution functions can be realized.

What are claimed are:

1. An electrodeposition element comprising:
   a first substrate including a first base substrate made of a first material, a first member arranged on the first base substrate and made of a second material different from the first material, and an electrode arranged above the first member;
   a second substrate arranged opposite to the first substrate and including an electrode;
   an electrolyte layer arranged between the electrodes of the first substrate and the second substrate, the electrolyte layer including an electrodeposition material that contains silver; and
   a mirror arranged on a surface of the first substrate at a side away from the electrolyte layer,
   wherein the first member has a micro-prism shape including concavities and convexities, and
   wherein, when a voltage is applied between the electrodes of the first substrate and the second substrate such that the first substrate side is negative and the second substrate side is positive, a reflective surface made of a silver thin film and reflecting light, which is incident from a direction normal to the first and second substrates, in a direction not parallel to the incident direction of the light is formed above the electrode of the first substrate.

2. The electrodeposition element according to claim 1, wherein the electrode of the first substrate has a shape corresponding to a surface shape of the first member.

3. The electrodeposition element according to claim 1, wherein, when a voltage is applied between the electrodes of the first substrate and the second substrate such that the first substrate side is negative and the second substrate side is positive, the electrodeposition element allows 10% or more of the light incident from the direction normal to the first and second substrates to transmit therethrough.

4. The electrodeposition element according to claim 1, wherein the electrode of the second substrate is a reflective electrode made of a metal.

5. The electrodeposition element according to claim 1, wherein the second substrate includes a second member and the electrode arranged above the second member, and
   wherein, when a voltage is applied between the electrodes of the first substrate and the second substrate such that the first substrate side is positive and the second substrate side is negative, a reflective surface made of a silver thin film and reflecting light, which is incident from the direction normal to the first and second substrates, in a direction not parallel to the incident direction of the light is formed above the electrode of the second substrate.

6. A mirror device comprising the electrodeposition element according to claim 1.

7. A mirror device comprising:
   the electrodeposition element according to claim 1, wherein the electrodeposition element is operated to electrically switch between a state allowing incident light to transmit therethrough and a state reflecting the incident light; and
   a mirror arranged not parallel to a reflective surface that is formed when the electrodeposition element is in the state reflecting the incident light.

8. An electrodeposition element comprising:
   a first substrate including a first base substrate made of a first material, a first member arranged on the first base substrate and made of a second material different from the first material, and an electrode arranged above the first member; a second substrate arranged opposite to the first substrate and including an electrode; an electrolyte layer arranged between the electrodes of the first substrate and the second substrate, the electrolyte layer including an electrodeposition material that contains silver; and a mirror arranged on a surface of the first substrate at a side away from the electrolyte layer, wherein the first member has a lens shape including concavities and convexities, and wherein, when a voltage is applied between the electrodes of the first substrate and the second substrate such that the first substrate side is negative and the second substrate side is positive, a reflective surface made of a silver thin film and reflecting light, which is incident from a direction normal to the first and second substrates, in a direction not parallel to the incident direction of the light is formed above the electrode of the first substrate.

* * * * *